Sept. 22, 1953     A. ESPOSITO ET AL     2,652,951

SALT AND PEPPER SHAKER

Filed March 13, 1951

INVENTORS A. GALANTINO
              A. ESPOSITO

BY Charles Baraff

AGENT

Patented Sept. 22, 1953

2,652,951

UNITED STATES PATENT OFFICE 2,652,951

SALT AND PEPPER SHAKER

Augustus Esposito, Irvington, and Anthony Galantino, Orange, N. J.

Application March 13, 1951, Serial No. 215,282

2 Claims. (Cl. 222—142.1)

This invention relates to dispensers and, more particularly, to salt and pepper shakers.

An object of the invention is a combined salt and pepper shaker, wherein either salt and/or pepper may be dispensed under the complete control of the user.

Another object of the invention is sanitation in the dispensing of salt and pepper and the prevention of caking or hardening of the salt in the shaker.

Another object of the invention is the prevention of accidental spilling of salt and pepper when the shaker is overturned.

Referring to the figures of the drawing:

Fig. 1 shows a perspective view of the combined salt and pepper shaker in accordance with the invention;

Fig. 2 discloses a cross-sectional view thereof;

Figure 1:
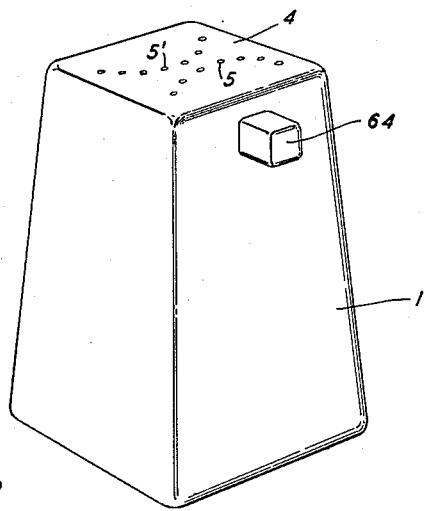
Figure 2:
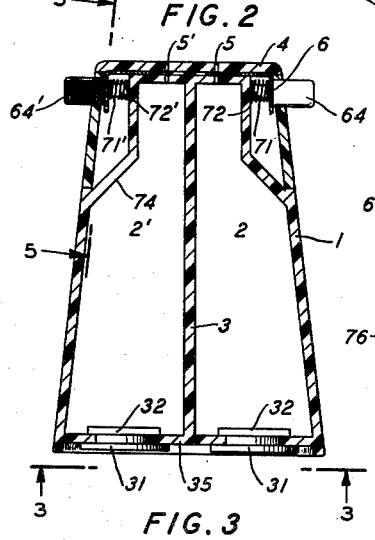

The combined salt and pepper shaker shown in Figs. 1 and 2 comprises a plastic container 1 of pyramidal shape having in its top wall 4 two sets of dispensing holes 5, 5', one set being for salt and the other for pepper. The container 1, as shown in Fig. 2, is divided internally by a longitudinal partition or wall 3 into two separate compartments 2 and 2', one being for salt and the other for pepper.

To control the dispensing of salt and/or pepper from the respective compartments 2, 2', there is provided a push-button operated closure plate 6 constructed of metal, one for each compartment, respectively. Each closure plate is provided with a flat portion 61 having a series of apertures 62 corresponding to the sets of openings 5 and 5', respectively, and aligned therewith when salt and/or pepper are to be dispensed. The closure plate 6 is movable to align the openings 62 with holes 5 and 5' for dispensing when the push-button 64 is pressed by the finger and is retracted by spring action to close the compartments 2, 2', respectively, and prevent the spilling of the contents thereof when the shaker is not in use.

Figure 3:
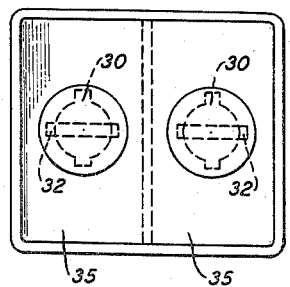
Fig. 3 is a bottom view thereof.

Fig. 3 shows the plastic bottom walls 35 of the compartments 2, 2' as provided with bayonet slot openings 30 for receiving plugs 31, which are then locked in place by rotation of projection pins 32 integral with the plugs into a locking position. The plugs 31 may be unscrewed for refilling the shaker when necessary.

Figure 4:
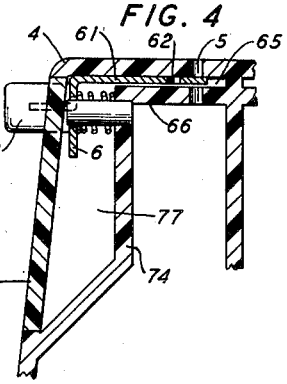
Fig. 4 is a cross-sectional view showing the movable closure plate for controlling the dispensing.
Figure 5:
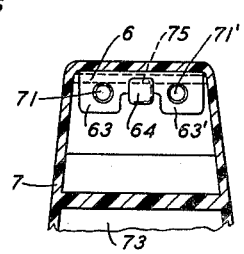
Fig. 5 is a section taken along the line 5—5 on Fig. 2.

Figs. 4 and 5 are cross-sectional views showing the construction, assembly, and mode of operation of the closure plate 6.

Referring to Fig. 4, the flat plate 61 rests in a slot 65 formed between the top wall 4 and a shelf portion 66 formed on an indented section 74 of side wall 7. When the push-button 64 is pressed, the plate 61 moves forward in the slot 65 to align its openings 62 with the holes 5 for dispensing. If salt is to be dispensed, for example, from compartment 2, the push-button 64 is pressed, while pepper is dispensed from compartment 2' by pressing the other push-button 64' on the opposite side of the shaker.

Fig. 5 is a section showing the assembly of the closure plate structure inside the indented section 74. Access to the interior space 77 is provided by a removable door 76. Movement of the closure plate 6 is guided by plastic guide pins 71, 71' formed integral with the upper end of the indented portion 74. The pins 71, 71' hold the coiled springs 72, 72', respectively, and fit into guide openings formed in the metal tabs 63, 63' formed integral with the closure plate 6. The upper portion of the door 76 is notched at 75 to receive the push-button 64.

Figures 6, 7:
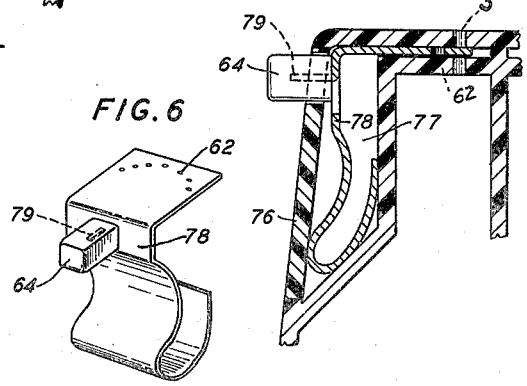
Fig. 6 is a perspective view of a modified closure member.
Fig. 7 is a sectional view showing the modified closure in the shaker.

Figs. 6 and 7 show a modified construction of the closure member which controls the dispensing of the salt and/or pepper. In this modification, the spring section is formed integrally with the flat movable plate containing the apertures. The closure plate and spring section may be formed from flat stainless steel, and the spring section is bent and shaped in a substantially U form to fit in the space 77. The flat tab 79, which is cut and bent out of member 78, fits into push-button 64 and is cemented thereto.

Normally, when the shaker is not in use, the closure plates are in a position to close the dispensing openings in the top wall. To dispense either salt or pepper, one of the push-buttons is operated to move the closure plate and produce alignment of its holes with the dispensing openings. Both salt and pepper may be dispensed simultaneously by operating both push-buttons.

Various modifications may be provided in the components of the dispenser without departing from the spirit of the invention.

What is claimed is:

1. A combination salt and pepper shaker comprising a plastic one-piece container of pyramidal shape having side walls and a top wall provided two sets of dispensing holes, a central partition having integral apertured shelf members parallel to said top extending in opposite directions to form individual slideways, each shelf member having an integral depending and inclined section forming a housing, a removable door on opposite side walls for providing access to said housings, a pair of flat valve plates slidable in said slideways and having openings therein, dependent tabs in said housings integral with said valve plates, guide pins formed integral with said dependent section and having coiled springs to retract the valve plates, and push-buttons mounted in said doors respectively and operated individually to move said valve plates to align said holes and apertures respectively.

2. A combined salt and pepper dispenser comprising a plastic container having sides and a top wall with sets of openings, a longitudinal partition in said container to provide individual compartments, shelf members integral with said partition and extending parallel to said top wall to provide slideways, said shelf members having sets of openings aligned respectively with the top wall openings, flat closure plates each having a set of similar openings and a centrally disposed push-button knob, dependent tabs integral with said closure plates and springs connected thereto, disposed symmetrically with respect to each push-button, whereby the springs may retract said plates to separately close said compartments and enclosed housings for said springs and tabs comprising dependent aprons integral with said shelves and a removable door on opposite sides respectively, and guide pins on said aprons for said springs engaging said tabs for centering said closure plates in said slideways to prevent jamming.

AUGUSTUS ESPOSITO.
ANTHONY GALANTINO.

References Cited in the file of this patent

UNITED STATES PATENTS

| Number | Name | Date |
|---|---|---|
| 518,559 | Berry | Apr. 17, 1894 |
| 848,015 | Dilworth | Mar. 26, 1907 |
| 933,796 | Stapleton | Sept. 14, 1909 |
| 1,248,345 | Kunkler | Nov. 27, 1917 |
| 1,292,506 | Nielsen | Jan. 28, 1919 |
| 2,411,489 | Williams | Nov. 19, 1946 |